United States Patent [19]

Burgeth et al.

[11] Patent Number: 4,558,191

[45] Date of Patent: Dec. 10, 1985

[54] BUTTON SWITCH DEVICE

[75] Inventors: Heinz Burgeth, Gräfenberg; Georg Leitner; Joachim Wolf, both of Nuremberg, all of Fed. Rep. of Germany

[73] Assignee: Telefunken Electronic GmbH, Heilbronn, Fed. Rep. of Germany

[21] Appl. No.: 581,055

[22] Filed: Feb. 17, 1984

[30] Foreign Application Priority Data

Feb. 18, 1983 [DE] Fed. Rep. of Germany ....... 3305619

[51] Int. Cl.$^4$ .............................................. H01H 3/12

[52] U.S. Cl. .................................... 200/5 A; 340/711; 364/709

[58] Field of Search ............... 200/159 R, 159 B, 5 A; 340/718, 719, 765, 784, 365 R, 711; 364/709

[56] References Cited

U.S. PATENT DOCUMENTS 4,145,120 3/1979 Kubota ............................... 340/718
4,231,098 10/1980 Tanimoto ........................... 200/5 A

*Primary Examiner*—A. D. Pellinen
*Assistant Examiner*—Morris Ginsburg
*Attorney, Agent, or Firm*—Spencer & Frank

[57] ABSTRACT

Series of conductors 3 and switch contact surfaces 2 are arranged on a base 1 of a button switch device. To permit additional functions aside from simple on-off switching operations to be exercised in one unit, circuit components 4, 5, 6 such as decoupling diodes, debouncing switch circuitry, microprocessors, display devices or the like are arranged on the base 1. These circuit components are in the form of film components and are connected to series of conductors on the base 1.

22 Claims, 1 Drawing Figure

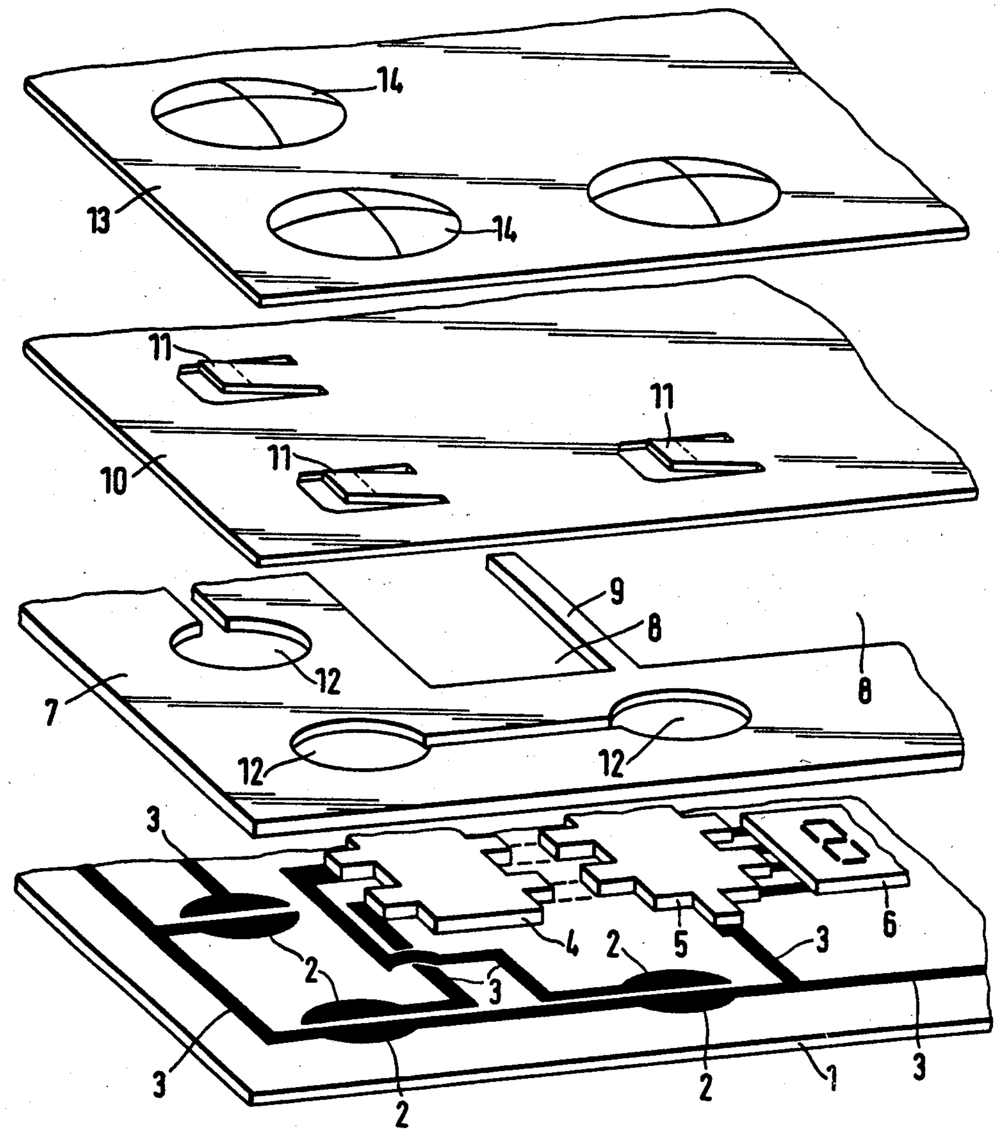
14
13
14
11
11
10
11
9
8
12
8
7
12
12
3
2
3
3
6
4
2
5
3
3
2
2
1
3

BUTTON SWITCH DEVICE

BACKGROUND OF THE INVENTION

1. Field of the Invention

The invention relates to a button switch device comprising a base having series of conductors and switch contact surfaces arranged thereon.

2. Description of the Prior Art

In a known button switch of this kind (German Utility Model No. 78 03 964), there is provided on a base a foil with imprinted series of conductors and switch contact surfaces. On the printed foil there rests a spacer plate comprising openings in the contact surface area. A cover plate with outwardly shaped switch dome members and series of conductors applied to the inner side covers the cover plate in such a manner that the switch dome members are located in the area of the openings and the switch contact surfaces, respectively. The series of conductors lead to freely accessible plug contact surfaces via which external circuit components arranged in a housing accommodating the button switch are connectable. In this arrangement, each switch contact surface requires an individual plug contact surface, with external circuit components to be connected to it being connectable via corresponding connection lines. The fact that the connection lines are partly very long introduces the danger of interference signals being received via them, which necessitates an appropriate anti-interference circuitry. Aside from the technical expenditure, there is also a loss in driving power.

SUMMARY OF THE INVENTION

The object underlying the invention is to provide a button switch device, which, as well as the simple on-off switch operations, also includes additional functions such as decoupling or de-bouncing individual switch contact sections, evaluating, processing and emitting data which have been fed in, and, which, furthermore, constitutes one unit.

In an embodiment according to the invention, circuit components incorporating a technical intelligence with regard to the switching operation can already be associated with the individual contacts on the base accommodating these contacts. Accordingly, if decoupling diodes are used, proper signal identification is ensured, even in the event of several buttons being actuated. Since these decoupling diodes may be directly connected to the series of conductors on the base, a substantial decrease is attained in the switching capacities which are otherwise unavoidable on account of long external leads. This also results in an increase in the reliability and a decrease in the manufacturing expenditure. Furthermore, de-bouncing circuitry or circuitry for evaluating, processing and emitting data fed in via the contact surfaces may be directly connected, as circuit components, to the base and the series of conductors arranged thereon. In an advantageous embodiment, these circuit components comprise film circuit components. These are diodes, resistances, integrated circuits or processors which are arranged and bonded on a thin, possibly elastic, film-type substrate. Such film circuit components are very flat and, therefore, enable the device with the button switch construction to be of very flat design. With a button switch device of such construction, electrical signals which have already been substantially processed can, therefore, be emitted to external switching components. Since the switch contact surfaces of the individual switches in a multiple-button-switch device must be correspondingly widely spaced from one another, in view of manual operation, the free space between them may be used for accommodating the circuit components. This results in very short electrical connections between the contact surfaces and the circuit components connections. The contact between the circuit components and the series of conductors may be effected by electrically conductive adhesives or by bonding. To obtain a planar construction, a spacer plate comprising correspondingly dimensioned openings in the area of the switch contact surfaces and in the area of the circuit components may be placed on the side of the base provided with the series of conductors and the circuit components. A cover plate which is to be placed thereon and may be provided with cooperating contacts, is then uniformly supported throughout its surface. The cover plate may simultaneously constitute a mechanical protection for the sensitive film switching components, so that mechanical forces or damp cannot affect them. On the other hand, the openings surrounding the film circuit components may also act as casting border for cast resin which is poured in.

BRIEF DESCRIPTION OF THE DRAWING

The FIGURE is an exploded view of a button switch device according to the invention.

DESCRIPTION OF THE PREFERRED EMBODIMENT

Switch contact surfaces 2 and series of conductors 3 are arranged on a base 1, which may be constituted by a foil. The contact surfaces 2, disposed in pairs, are arranged in mutually spaced relationship, which is essential for proper manual operation. Also disposed on the side of the base 1 comprising the switch contact surfaces 2 are circuit components 4, 5, 6, with the circuit component 4 comprising, for example, decoupling diodes and de-bouncing switch means, while the circuit component 5 may be a processor with input and output lines which drives the LCD or another display device 6. Also, series of conductors may extend from individual switch contact surfaces 2 or circuit components 4, 5, 6 to connection surfaces which are to be connected to external circuit components.

The circuit components 4, 5, 6 comprise film switching components and their height is, therefore, a mere tenth of a millimeter. On account of the low height of the film circuit components 4, 5, 6, the base 1 may have correspondingly shaped recesses for accommodating these film circuit components. However, in order not to decrease the stability of the base 1, the film circuit components 4, 5, 6 are positioned on the side comprising the series of conductors 3 and are fixed thereon. This may be effected by the joining of the corresponding series of conductors to the film circuit component connections using, for example, electrically conductive adhesives. It is, however, also possible to use the bonding technique wherein the electrical connection is made via thin wires. The film circuit components 4, 5, 6 are then arranged in mutually spaced relationship, so that openings 8 adapted to the individual film circuit components with webs 9 located between them may be provided in a spacer plate 7 which is to be placed on the base. The thickness of the spacer plate 7 is preferably somewhat greater than that of the film circuit components 4, 5, 6 so that a cover plate 10, which is to be placed on the spacer plate 7 and may be subjected to pressure forces, cannot affect the film circuit components.

The cover plate 10 comprises switch tongues 11 arranged congruently with the switch contact surfaces 2 disposed in pairs. In order that the switch tongues 11 may be brought into contact with the switch contact surfaces 2, recesses 12 are appropriately arranged in the spacer plate 7. The spacer plate 7 and the cover plate 10 are preferably likewise constituted by foils. The spacer plate 7 not only fulfills the purpose of electrically isolating the switch tongues 11 with their cooperating contacts and series of conductors, if such are provided for them, from the series of conductors 3 and the switch contact surfaces 2, it simultaneously serves to relieve the film circuit components 4, 5, 6 of mechanical pressure forces acting on the cover plate 10. The openings 8 in the spacer plate 7 act, in addition, as cast mold if the film circuit components are fixed to the base 1 by cast resin. In the area of the optical circuit component 6, it is expedient to let remain the cast resin over its side surface remote from the base 1, as the readability is then increased by the transparent cast resin. The cast resin may also be colored, if the optical circuit component 6 itself transmits light, and different luminous displays are to be obtained for several displays. The transparent cover plate is preferably placed on the cast resin while still in the liquid state so as to avoid, in this case, too, reflections at separation layers comprised of media of different densities.

A top plate 13 with switch dome members 14, shaped in an outward direction, elastically depressible and preferably provided with a snap function, in the area of the switch tongues 11, is then placed on the cover plate 10.

The integral top plate 13 shields the switching sections 2, 11 and the film switching components 4, 5, 6 against damp and dirt and may be provided with signs as an indication of the function of the respective switching section. For example, the exercising of evaluating functions or the performing of computer operations which transfer corresponding control signals to externally connected switching components is possible via the film circuit component 5 equipped with a microprocessor. Accordingly, the button switch device can emit not only simple on-off switching signals of the individual contact devices 2, 11 but also electrical signals which have already been processed and are otherwise only obtainable via externally connected circuit means.

What is claimed is:

1. A button switch device, comprising:

- a base;
- a conductor pattern on said base, said conductor pattern including pairs of spaced-apart switch contact surfaces;
- film circuit components on said base and distributed among said pairs of switch contact surfaces, said circuit components being electrically connected to said conductor pattern;
- a spacer plate on top of said base, said spacer plate having recesses at respective pairs of switch contact surfaces and having recesses at respective circuit components to accommodate said components, said spacer plate having a thickness greater than that of said circuit components; and
- switch closure means spaced apart from said pairs of contact surfaces and manually moveable toward respective pairs of contact surfaces for selectively connecting the contact surfaces of respective pairs.

2. A button switch device according to claim 1, wherein the base has recesses into which the circuit components are at least partially inserted.

3. A button switch device according to claim 2, wherein the circuit components are fixed in respective recesses in said spacer plate by cast resin.

4. A button switch device according to claim 3, wherein the cast resin covers the circuit components and is translucent, and wherein the circuit components comprise an optical display device.

5. A button switch device according to claim 3, wherein the cast resin is colored.

6. A button switch device according to claim 3, wherein the switch closure means comprises a cover plate on top of the spacer plate, the cover plate covering the circuit components, and wherein the cover plate is placed on the cast resin while still in the liquid state, and is translucent.

7. A button switch device according to claim 1, wherein the switch closure means comprises a cover plate on top of the spacer plate, the cover plate covering the circuit components.

8. A button switch device according to claim 7, wherein the cover plate is provided with cooperating contacts.

9. A button switch device according to claim 1, wherein the switch closure means comprises a cover plate on top of the spacer plate, the cover plate covering the circuit components, and wherein at least one of the base, the spacer plate, and the cover plate comprises a flexible sheet element.

10. A button switch device according to claim 1, wherein the circuit components are connected to the conductor pattern by one of electrically conductive adhesive and bonding.

11. A button switch device according to claim 1, wherein the circuit components comprise decoupling diodes which are connected to switch contact surfaces.

12. A button switch device according to claim 1, wherein the circuit components comprise a microprocessor which is operatively connected to switch contact surfaces and to output lines provided on the base.

13. A button switch device according to claim 12, wherein the microprocessor comprises a computer.

14. A button switch device according to claim 11, wherein the circuit components further comprise an optical display device, and wherein outputs of the microprocessor are connected to the optical display device.

15. A button switch device according to claim 1, wherein the base has a rear side which is coated with an adhesive.

16. A button switch device according to claim 1, wherein the base and conductor pattern comprise a printed circuit board.

17. A button switch device according to claim 1, wherein the device is extremely flat.

18. A device having button switches for manual actuation by human fingers, comprising:

- a base;
- a conductor pattern affixed to said base, said conductor pattern including an array of pairs of spaced-apart switch contact surfaces, said array being spaced to facilitate manual actuation by human fingers;
- thin circuit components affixed to said base and disposed among said array, said circuit components being electrically connected to said conductor pattern;

a spacer plate affixed flat against said base and covering a portion of said conductor pattern, said spacer plate having switch apertures which expose respective pairs of switch contact surfaces and having component apertures into which respective components extend, said spacer plate being at least as thick as said components;

a cover plate affixed flat against said spacer plate and extending over said switch and component apertures, said cover plate including manually displaceable means disposed over said switch apertures for electrically connecting respective pairs of switch contact surfaces.

19. The device of claim 18, further comprising casting resin filling said component apertures.

20. The device of claim 19, wherein at least one of said components comprises debouncing circuitry.

21. The device of claim 19, wherein at least one of said components comprises a microprocessor.

22. The device of claim 19, wherein at least one of said components comprises a display device.

* * * * *